3,302,795
SELF-CLEANING FILTER
James W. Jacobs, Dayton, Ohio, assignor to General Motors Corporation, Detroit, Mich., a corporation of Delaware
Filed Aug. 30, 1963, Ser. No. 305,617
4 Claims. (Cl. 210—391)

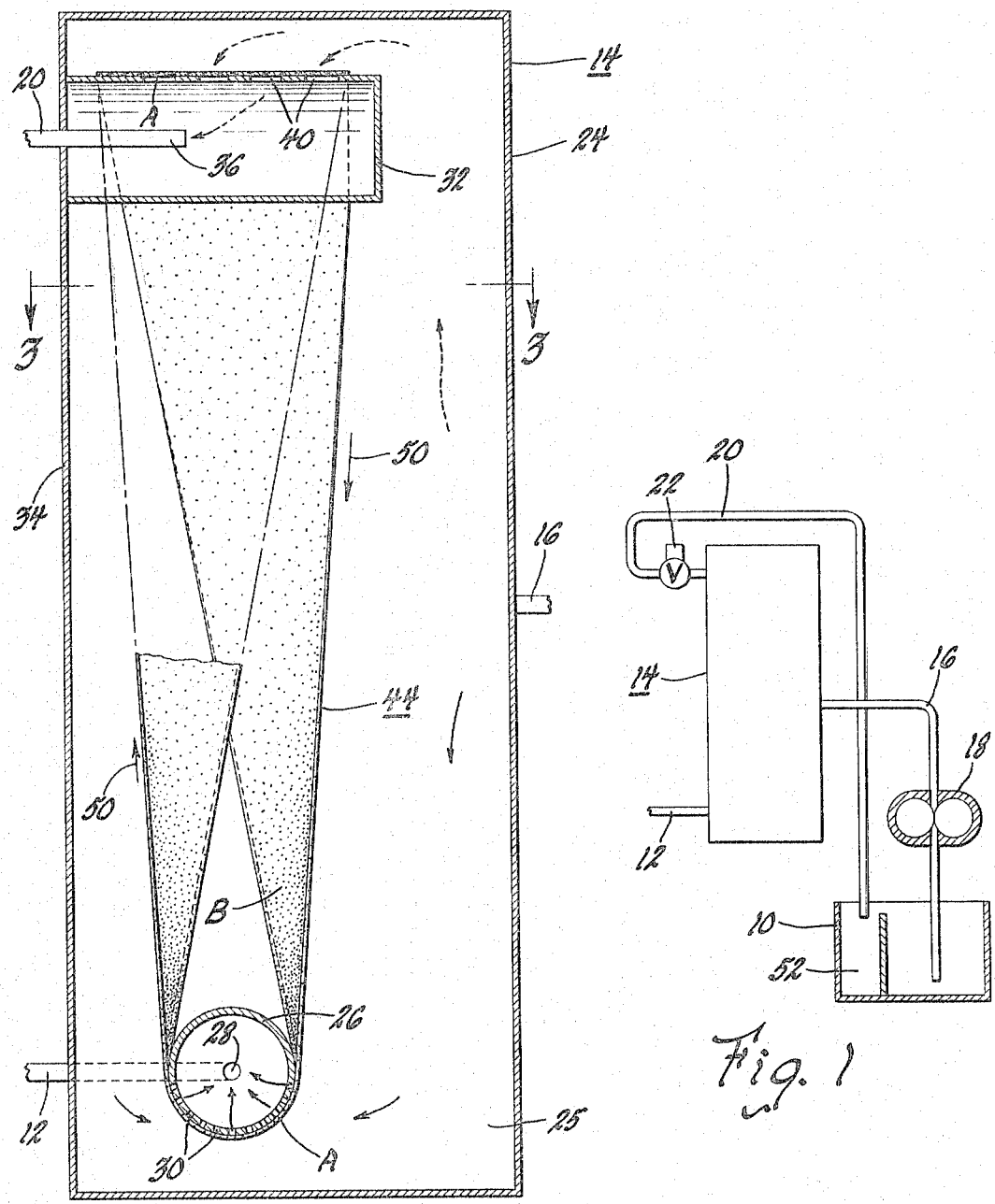

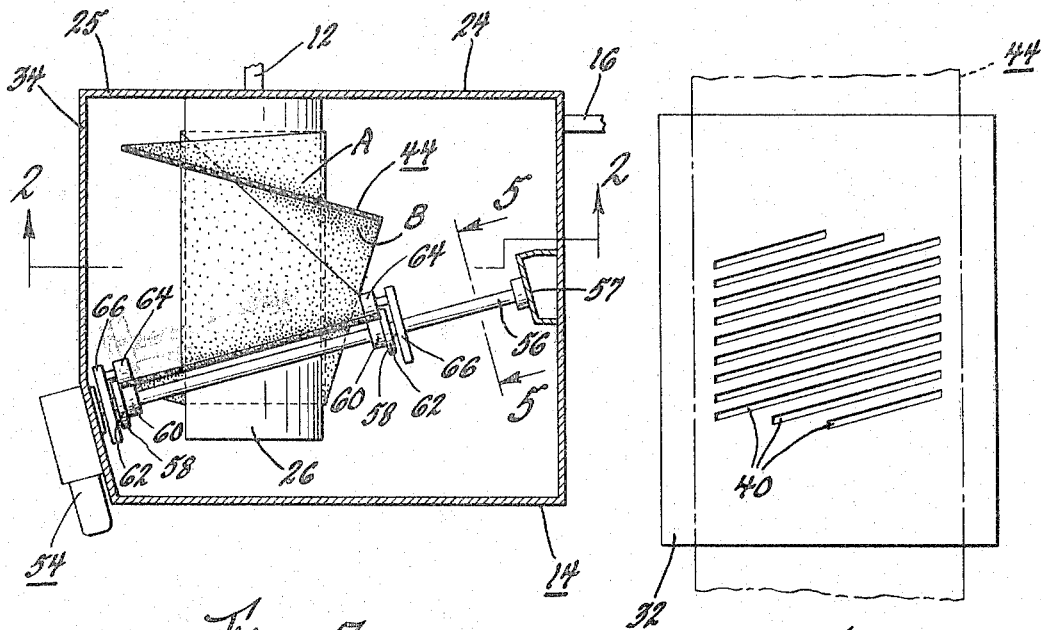

This invention relates to dry cleaning apparatus and more particularly to a self-cleaning filter element comprised of an endless belt having a half twist therein.

In dry cleaning apparatus, the efficiency of the dry cleaning operation depends to a large extent on the effectiveness of a filter element to remove contaminants from the circulating dry cleaning solvent. Where a replaceable filter element is used, it is desirable to secure the greatest life possible in order to minimize the cost of operation. For this reason filters in the prior art have been made self-cleaning.

Accordingly, it is an object of this invention to provide an improved filter element which is self-cleaning.

A more particular object of this invention is the provision of a filter element comprised of an endless belt having a half twist therein, each section of which is movable sequentially into engagement with a liquid supply and a liquid outlet in a manner whereby contaminants are first filtered from the liquid onto said filter element at said liquid supply and then flushed from said filter element at said liquid outlet.

It is a general object of this invention to provide a filter element comprised of an endless belt having a half twist therein.

Further objects and advantages of the present invention will be apparent from the following description, reference being had to the accompanying drawings wherein a preferred embodiment of the present invention is clearly shown.

In the drawings:

FIGURE 1 is a schematic representation of a circulating solvent system provided with the self-cleaning filtering unit of this invention;

FIGURE 2 is a sectional view of the filtering unit taken along line 2—2 in FIGURE 3;

FIGURE 3 is a sectional view taken along line 3—3 in FIGURE 2;

FIGURE 4 is an elevational view of the fluid outlet from the filtering unit illustrating the wiping ports therein for removing contaminants from the filter element and showing the filter element related therewith in phantom line; and FIGURE 5 is a sectional view taken along line 5—5 in FIGURE 3 to illustrate one suitable means for driving the filter element.

In accordance with this invention and with reference to FIGURE 1, a circulating solvent system is shown comprised of a sump 10 for collecting a fluid, such as dry cleaning solvent, and a filtering unit outlet conduit 12 for supplying decontaminated fluid to any suitable dry cleaning apparatus, such as that taught in the copending application Serial No. 285,189, filed May 27, 1963, now Patent No. 3,132,501, issued May 12, 1964, and assigned to the same assignee as this invention. Interposed between the sump 10 and the filtering unit outlet conduit 12 is a filtering unit 14 which is supplied through a filtering unit inlet conduit 16 in communication with the sump 10 by means of a pump 18. A backwash conduit 20 in communication with the sump 10 is selectively opened to the filtering unit 14 by means of a valve 22 for backwashing the contaminant from the filter element in the filtering unit 14, as will be described more fully next following.

Turning now to FIGURE 2, the filtering unit 14 is shown comprised of a generally imperforate box-like casing 24 having a cylindrical closed-end support spool or filtered liquid supply housing 26 extending from one wall 25 of the casing and enclosing the opening 28 of the outlet conduit 12 into the casing 24. The lower half of the support spool 26 is perforated, as at 30, to place the opening 28 in communication with the inlet conduit 16. Thus, all solvent flowing through the filtering unit 14 must pass into the support spool 26 before it can leave the filtering unit by way of the outlet conduit 12.

A generally cylindrical, closed-end backwash support spool or housing 32 extends from the casing wall 34 and encloses the terminal end 36 of the backwash conduit 20. Note that the backwash support spool 32 has a longitudinal axis ninety degrees opposed to the outlet support spool 26 and includes a plurality of slots 40 on an upper portion thereof and in diagonal relationship to the axis of the spool 32.

In accordance with this invention, the filtering unit 14 is provided with a novel filter element 44 comprised of a belt-like sheet of paper or other suitable sheet-like filtering material. In order that the filtering element 44 can be made self-cleaning, the element is formed as an endless belt having a half twist therein. In other words, the belt 44 is formed by taking a long rectangular strip of filter material, such as paper or cloth, and joining the ends of the material together permanently after one end of the rectangle has been rotated one hundred and eighty degrees with respect to the other end. This produces an element characterized by having a continuous surface and one edge, even though at any given point, there appears to be two surfaces A and B (FIGURE 3). Such an element, when rotated by a suitable drive motor, will present both surfaces to any given support spool over which it is being moved.

The preformed filter element 44 is installed in the filtering unit 14 through any suitable access panel (not shown) by slipping one end of the belt over the outlet support spool 26 and the other end thereof over the backwash support spool 32, as shown in FIGURE 2. The filter belt or element is installed over the spool 26 in a manner to cover the perforations 30 at one end thereof and to cover the wiping slots 40 on the support spool 32 at the other end thereof.

In operation, contaminants are deposited on the surface A immediately adjacent the perforations 30 as the solvent flows from the inlet conduit 16 to the outlet conduit 12 (see solid flow arrows). As the filter element 44 is rotated in the direction of arrow 50, the outer surface A of the filter element becomes the inner surface of the filter element as it passes into juxtaposition with the wiping slots 40 on the backwash support spool 32. Periodically, the valve 22 is opened and either all of the supply from pump 18 or a portion thereof (dashed arrows) is directed through the filter element 44 into the backwash spool 32 and the backwash conduit 20. The diagonal relationship of the wiping ports 40 effects a wiping action as the contaminated surface of the filter element moves thereacross, thereby to aid in the removal of the sludge or contaminants from the surface of the element. The sludge returns to a settling bed 52 which may be a portion of the sump 10.

Any suitable means may be provided for rotating the filter element 44 around the support spools 26 and 32. One suitable means includes a motor and gear reduction assembly 54 for rotating a drive shaft 56 journaled at 57 on an opposite portion of the filtering unit 14. Rollers 58 are affixed at spaced points along the drive shaft for rotation therewith. Each roller includes a drive portion 60 and an aligning portion 62 for positioning the edges of the filter element 44 therebetween. In order to maintain a constant driving bias along the edge of the filter element, a pressure roller 64, carried on a floating spring biased rack 66, is positioned adjacent the drive section 60 of the drive roller on the opposite side of the filter element.

It should now be seen that an improved filter element has been provided in the form of an endless belt having a half twist therein to facilitate the self-cleaning of the filter element as it is rotated in a filtering chamber between spaced outlets from the chamber and in flow intercepting relationship to said outlets from the chamber.

While the embodiment of the present invention as herein disclosed constitutes a preferred form, it is to be understood that other forms might be adopted.

What is claimed is as follows:

1. A filtering system comprising means forming a filtering chamber wherein contaminants are filtered from unfiltered fluid supply means for supplying unfiltered fluid to said chamber, means in communication with said supply means for supplying filtered fluid from said chamber and including a perforated supply housing in said chamber, means in communication with said supply means for removing the filtered contaminants from said chamber and including a perforated backwash housing in said chamber spaced from said supply housing and at substantially right angles thereto, and filter means circumscribing said housings in a manner to cover the perforations therein and interposed in fluid flow intercepting relationship between said means for supplying unfiltered fluid and both said means for supplying filtered fluid and said means for removing the filtered contaminants, each portion of said filter means being movable sequentially into a first position in engagement with said supply housing for filtering contaminants from unfiltered fluid flowing from said means for supplying unfiltered fluid to said means for supplying filtered fluid and then into a second position in engagement with said backwash housing for removing the contaminants filtered in said first position from said filter means as said unfiltered fluid flows from said means for supplying unfiltered fluid to said means for removing the filtered contaminants, said filter means comprising an endless belt of filtering material having a half twist therein whereby one surface portion of said belt alternately faces away from said supply housing and toward said backwash housing.

2. The filtering system of claim 1 wherein said means for removing the filtered contaminants includes a selectively operable valve for periodically effecting the removal of filtered contaminants.

3. The filtering system of claim 1 including drive means engageable with an edge of said belt for moving said filter means.

4. A filtering system comprising means forming a filtering chamber wherein contaminants are filtered from unfiltered fluid, supply means for supplying unfiltered fluid to said chamber, means in communication with said supply means for supplying filtered fluid from said chamber and including a perforated supply housing in said chamber, means in communication with said supply means for removing the filtered contaminants from said chamber and including a perforated backwash housing in said chamber spaced from said supply housing and at substantially right angles thereto, and filter means circumscribing said housings in a manner to cover the perforations therein and interposed in fluid flow intercepting relationship between said means for supplying unfiltered fluid and both said means for supplying filtered fluid and said means for removing the filtered contaminants, each portion of said filter means being movable sequentially into a first position in engagement with said supply housing for filtering contaminants from unfiltered fluid flowing from said means for supplying unfiltered fluid to said means for supplying filtered fluid and then into a second position in engagement with said backwash housing for removing the contaminants filtered in said first position from said filter means as said unfiltered fluid flows from said means for supplying unfiltered fluid to said means for removing the filtered contaminants, said filter means comprising an endless belt of filtering material having a half twist therein whereby one surface portion of said belt alternately faces away from said supply housing and toward said backwash housing and the perforations of said backwash housing being formed as elongated slots diagonally arranged with respect to said belt for wiping the contaminants from said surface portion thereof.

References Cited by the Examiner

UNITED STATES PATENTS

| 736,596 | 8/1903 | Grondahl | 210—386 |
| 1,966,626 | 7/1934 | Henry | 210—411 X |

FOREIGN PATENTS

| 691,923 | 6/1940 | Germany. |

REUBEN FRIEDMAN, *Primary Examiner.*

SAMIH N. ZAHARNA, *Examiner.*